(12) United States Patent
Haj-Maharsi et al.

(10) Patent No.: US 9,690,267 B2
(45) Date of Patent: Jun. 27, 2017

(54) SELECTIVE DROOP RESPONSE CONTROL FOR A WIND TURBINE POWER PLANT

(75) Inventors: Mohamed Haj-Maharsi, Dhahran (SA); Jason Hoffman, Alburtis, PA (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 713 days.

(21) Appl. No.: 14/125,354

(22) PCT Filed: Jun. 12, 2012

(86) PCT No.: PCT/DK2012/050201
§ 371 (c)(1),
(2), (4) Date: Jul. 7, 2014

(87) PCT Pub. No.: WO2012/171532
PCT Pub. Date: Dec. 20, 2012

(65) Prior Publication Data
US 2014/0316592 A1    Oct. 23, 2014

Related U.S. Application Data

(60) Provisional application No. 61/496,599, filed on Jun. 14, 2011.

(30) Foreign Application Priority Data

Aug. 9, 2011    (DK) ................... 2011 70438

(51) Int. Cl.
*G05B 15/02* (2006.01)
*F03D 7/02* (2006.01)
(Continued)

(52) U.S. Cl.
CPC ........... *G05B 15/02* (2013.01); *F03D 7/0284* (2013.01); *F03D 7/042* (2013.01); *F03D 7/048* (2013.01);
(Continued)

(58) Field of Classification Search
CPC ......... G05B 15/02; F03D 9/11; F03D 7/0284; F03D 7/042; F03D 7/048; F03D 9/003;
(Continued)

(56) References Cited

U.S. PATENT DOCUMENTS 7,071,579 B2 *   7/2006   Erdman ................ F03D 7/0284
                                                              290/44
8,154,141 B2 *   4/2012   Andresen .............. F03D 7/0224
                                                              290/44
(Continued)

FOREIGN PATENT DOCUMENTS

DE    102005052011 A1    5/2007
EP        2306001 A2    4/2011
(Continued)

OTHER PUBLICATIONS

Danish International Search Report; PA 2011 70438; Apr. 12, 2012.
(Continued)

*Primary Examiner* — Robert Fennema
*Assistant Examiner* — Tri T Nguyen
(74) *Attorney, Agent, or Firm* — Patterson + Sheridan, LLP (57) ABSTRACT

A power plant controller (36) is described. The power plant controller (36) controls a power generation system (10) having one or more power generators (12) and an energy storage system (22), and provides a utility grid or transmission system operator with the capability to select the droop response provided by the power generation system. Accordingly, an operator can request a specific generator droop response in order to provide appropriate frequency and grid control services. The power plant controller (36) operates in real time determining one or more power characteristics of the power generation system (10). Based on these characteristics and an indication of a future predicted power output for the power generation system, the power plant controller can take the necessary steps to ensure that the power (Continued)

generation system is capable of responding with the selected droop response, or can advise the operator that a different droop is preferred.

20 Claims, 5 Drawing Sheets (51) Int. Cl.
    *F03D 7/04*     (2006.01)
    *H02J 3/38*     (2006.01)
    *F03D 9/11*     (2016.01)
    *F03D 9/25*     (2016.01)

(52) U.S. Cl.
    CPC ................ *F03D 9/11* (2016.05); *F03D 9/255* (2017.02); *F03D 9/257* (2017.02); *H02J 3/386* (2013.01); *F05B 2270/1071* (2013.01); *F05B 2270/337* (2013.01); *Y02E 10/723* (2013.01); *Y02E 10/725* (2013.01); *Y02E 10/763* (2013.01)

(58) Field of Classification Search
    CPC .............. H02J 3/386; F05B 2270/1071; F05B 2270/337; Y02E 10/723; Y02E 10/725; Y02E 10/763
    See application file for complete search history.

(56) References Cited

U.S. PATENT DOCUMENTS

| 2006/0087124 | A1 | 4/2006 | Stahlkopf | |
| 2010/0090532 | A1* | 4/2010 | Shelton | H02J 3/32 307/46 |
| 2010/0138070 | A1* | 6/2010 | Beaudoin | F03D 7/0284 700/297 |
| 2011/0257801 | A1* | 10/2011 | Kumula | F01D 15/10 700/287 |

FOREIGN PATENT DOCUMENTS

| WO | 2010/108910 A2 | 9/2010 |
| WO | 2011/019321 A2 | 2/2011 |

OTHER PUBLICATIONS

International Search Report; PCT/DK2012/050201; Nov. 15, 2012.

Istvan Erlich et al: "Spannungsregelung mit moderner WEA-Technik", 14. Kasseler Symposium Energie-Systemtechnik, Jan. 1, 2009, pp. 108-117.

* cited by examiner

SELECTIVE DROOP RESPONSE CONTROL FOR A WIND TURBINE POWER PLANT

The invention relates to a control system for a wind turbine power plant, and in particular to a control system that provides selective droop response control for adjusting the amount and rate of the primary and secondary frequency response of a power generation system.

Droop is a power-frequency characteristic of a generator, and is traditionally defined as the magnitude of the change in speed or frequency at the grid that is necessary to cause the main prime mover control mechanism of the generator to move from fully closed to fully open.

In the case of a power generation unit connected to the grid, therefore, a 4% droop indicates that the generator unit's rotor speed will (in the absence of other generation) change by 4%, if the load connected to the generation unit changes from full load to zero load. If the generation unit rotor speed were by default equivalent to 60 Hz, then a sudden loss of the load, such as that caused by loss of the primary transmission line connecting the unit to the grid, would cause the rotor speed to increase by 2.4 Hz (0.04×60 Hz) to 62.4 Hz. Similarly, if the generation unit was put on line at a speed of 60 Hz, and the load was increased from zero to 100%, then the rotor speed of the generation unit would drop by 2.4 Hz to 57.6 Hz.

It is known to use generation units for grid frequency control. In this case, the grid frequency is detected by a sensor attached to a control system, and where the grid frequency is found to have fallen below a desired steady-state value or range, the control system causes power to be injected by the generation unit into the grid to increase the grid frequency. Similarly, if the grid frequency is detected to be above the desired steady-state value or range of values, then the control system instructs the generation unit to decrease its power output, until the grid frequency has returned to the desired level. In such scenarios, the droop setting also serves to define the amount of power that can be supplied to the grid for a given change in frequency. Thus, a generation unit may be required to provide 3.5 MW for each 0.01 Hz deviation of frequency away from the steady-state value. The droop setting of the generation unit, which is dependent on the size of the unit, dictates the generation unit's ability to provide this power, as will now be described with reference to FIG. 1.

Figure 1:
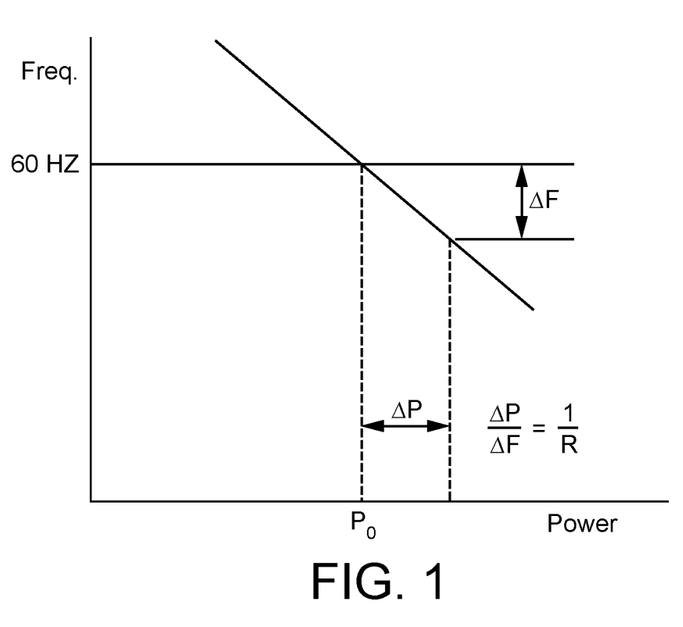
FIG. 1 is a graph illustrating the droop characteristic of a generation system.

FIG. 1 is an example droop curve for a power generation unit, and expresses the relationship between change in power (in per units) to the change in frequency (in per units). As will be appreciated by the person skilled in the art, per units are used to relate parameters to an underlying base line figure, often taken from the rating of the electrical device. The inverse of the droop R is given be the gradient of the graph $\Delta P/\Delta f$. Historically, the droop response characteristic has been developed as a function of the available generator turbine technology. For example, due to physical limitations of the steam turbines employed in coal fired power stations, a coal plant would typically elect to operate with a droop of 5%. Assuming that an electrical generation unit is operating with a rated speed of 60 Hz, and has a power rating of say, 900 MW, the droop response allows the available power response to frequency deviation to be determined as follows:

$\Delta P = (1/R) \cdot \Delta f$ or $\Delta P/900 = (1/0.05) \cdot \Delta f/60$ Assuming, that $\Delta f$ is taken to be 1 Hz, the power response in this example would equate to 300 MW/Hz. A higher value for the droop can therefore be seen to reduce the amount of power that is to be injected to the grid for a given variation in frequency, while, a lower value of droop implies that more power is required. The change in power fed into the grid by the generation unit to compensate for a deviation in frequency is referred to as the droop response.

With generation units providing frequency control as described above, a frequency disturbance occurring at the grid typically result in a primary and a secondary response. The primary response occurs within seconds of the original disturbance and is a result of inertia in the synchronous armatures of the generators acting to stabilise the system at a new frequency. The secondary response is a result of the frequency control carried out at the generation unit and there typically occurs over a time period a few minutes after the initial disturbance. In order to provide, this secondary response the generation units are required to have some additional capacity to provide the agreed power response. This additional power capacity is often referred to as spinning reserve: essentially one or more power generation units are spun up into an operational state where power is being produced, but is not yet being supplied to the grid. When the additional power is required, the generation units providing the spinning reserve are connected to the meet the additional power demand.

Wind turbines are already expected to play a role in stabilising grid frequency, injecting power into the grid at under frequency, and scaling power back at over-frequency. We have appreciated that as wind turbine penetration of energy production increases, utility operators will increasingly require wind turbines to contribute to grid frequency response for stability. Wind turbines use inverter based power generation technology, and do not have the same physical limitations as their historical power generation cousins, such as coal, gas, or nuclear generation. However, we have appreciated that power generation from wind turbines is typically carried out irrespective of this fact. For example, in a single control region of the electricity generation grid, the droop setting will typically simply be set to the same value, say 5%, for all generators, despite differences in capability of individual generation units.

The time scale over which the secondary response is expected is also typically set by the grid operators, but to date has been dependent on the speed of response of the historical generation units. We have appreciated that wind turbines can be used to provide a more flexible time scale for droop response, operating faster or slower than the historical generation units according to requirements. Particularly, as wind turbines have the capability to provide a faster droop response if required, we have appreciated that the potential of wind turbine production is not being used to its fullest extent.

We have therefore appreciated that there is a need to provide a wind turbine power plant control system in which the operation of the wind turbines can be configured more precisely to reflect changes in demand.

SUMMARY OF THE INVENTION

The invention is defined in the independent claims to which reference should now be made. Advantageous features are set forth in the dependent claims.

An embodiment of the invention provides a power generation system comprising: a power generator for generating power from a renewable energy resource; a connection point connecting the power generator to a power grid, the connection point having a transformer with a low voltage side and a high voltage side, the power generator being coupled to the low voltage side; an energy storage system coupled to the low voltage side of the connection point, wherein the energy storage system is operable to provide or store power to regulate the power output from the power generator to the grid; a power plant controller for receiving a power input indicating one or more power characteristics of the grid, the power generator, the energy storage system, and or the connection point, as well as a request from the power grid operator to provide power generation at specified selectable droop response, wherein based on the power input and the specified selectable droop response, the power plant controller controls the power generator and/or the energy storage system.

The power plant controller may comprise a memory for logging requests from the power grid operator for a specified selectable droop response for future time periods.

The power plant controller may be operable to alert the power grid operator if a request from the power grid operator to provide power generation at specified selectable droop response coincides in time with a separate earlier request.

The power plant controller may determines a predicted future power output for a time period corresponding to a time period where a specified selectable droop response has been requested, and on the basis of the determined predicted future power output controls one or more of the energy storage device and the power generator.

The power plant controller may, on the basis of the determined predicted future power output, control the energy storage device to ensure that it has a full charge to meet the request for the specified selectable droop response.

The power plant controller may derate the power generator in advance of a time period where a specified selectable droop has been requested in order to provide generation capacity to meet the specified selectable droop response.

The power plant controller may issues an alarm where a selected droop response cannot be provided due to a shortfall in a predicted future power output, and/or the storage capacity of the energy storage system.

The energy storage system may be operable to store power from the power generator when the power produced by the generator is in excess of the power required by the power grid, and for outputting power to the grid when the power produced by the generator is less than the power required by the power grid.

The selectable droop response includes one or more of, a droop setting, a droop response magnitude, and a droop response time.

The power generator may comprise one or more of a wind energy turbine, a wave or tidal energy turbine, or a solar cell. The power generator may comprise a plurality of wind turbines in a wind park.

A second embodiment of the invention provides a power plant controller for controlling the operation of a power generation system comprising a power generator for generating power from a renewable energy resource, a connection point connecting the power generator to a power grid, the connection point having a transformer with a low voltage side and a high voltage side, the power generator being coupled to the low voltage side and an energy storage system coupled to the low voltage side of the connection point, wherein the energy storage system is operable to provide or store power to regulate the power output from the power generator to the grid, wherein the power plant controller is operable to receive a power input indicating one or more power characteristics of the grid, the power generator, the energy storage system, and or the connection point, as well as a request from the power grid operator to provide power generation at specified selectable droop rate, wherein based on the power input and the specified selectable droop, the power plant controller controls the power generator and/or the energy storage system.

A third embodiment of the invention provides a method of generation using a power generation system comprising a power generator for generating power from a renewable energy resource, a connection point connecting the power generator to a power grid, the connection point having a transformer with a low voltage side and a high voltage side, the power generator being coupled to the low voltage side, and an energy storage system coupled to the low voltage side of the connection point, wherein the energy storage system is operable to provide or store power to regulate the power output from the power generator to the grid, the method comprising: receiving, at a power plant controller, a power input indicating one or more power characteristics of the grid, the power generator, the energy storage system, and or the connection point; receiving, at a power plant controller, a request from a power grid operator to provide power generation at specified selectable droop response; controlling the power generator and/or the energy storage system based on the power input and the specified selectable droop response.

BRIEF DESCRIPTION OF THE DRAWINGS

Example embodiments of the invention will now be described with reference to the drawings, in which.

DETAILED DESCRIPTION OF THE PREFERRED EMBODIMENTS

Examples of the invention comprise a power generation system that includes a wind park and an energy storage system. The energy storage system is arranged to supplement the power output from the wind park at times of increased demand, and store excess energy when demand is low. The power generation system operates under the control of a novel Power Plant Controller that makes it possible for utility operators to dynamically select the droop response provided by the system to meet their requirements. In this context, the droop response provided by the wind power generation system is configurable in the sense that utility operators may select the magnitude of the power response, the time scale over which the power is delivered or withheld, as well as the actual droop setting applied to the generation unit.

Modern wind turbines operate under the guidance of control systems, such as SCADA (Supervisory Control and Data Acquisition system) to offer grid frequency regulation services. The grid frequency is governed by the overall power balance in the grid, and to a simple approximation, is proportional to the synchronous generators' rotational speed. Essentially, it is the inertia of the rotating inertias that determines the grid frequency. In steady state operation, the grid operator tries to ensure that supply of power from all connected generators matches the demand for power by consumers, the load. As demand varies throughout the day grid operators will signal to generation providers that more or less power is required at particular times.

The SCADA system of modern wind turbines has a frequency controller function for controlling the injection of power into the grid, and is typically configured to match the droop characteristic of conventional generators. The frequency controller increases the power reference P(ref) for the wind turbine at under frequency, and decreases the power reference at over frequency. The amount of the increase or decrease is usually set with reference to an active power control curve developed to suit the local grid code requirements. An adjustable dead band means that frequency deviations that persist only for small durations of time do not activate the frequency controller. Since the frequency controller operates based on the instantaneous grid frequency, usually measured at the input to the wind turbine or at the point of common coupling, no centralised control for the wind park is actually necessary.

Figure 2:
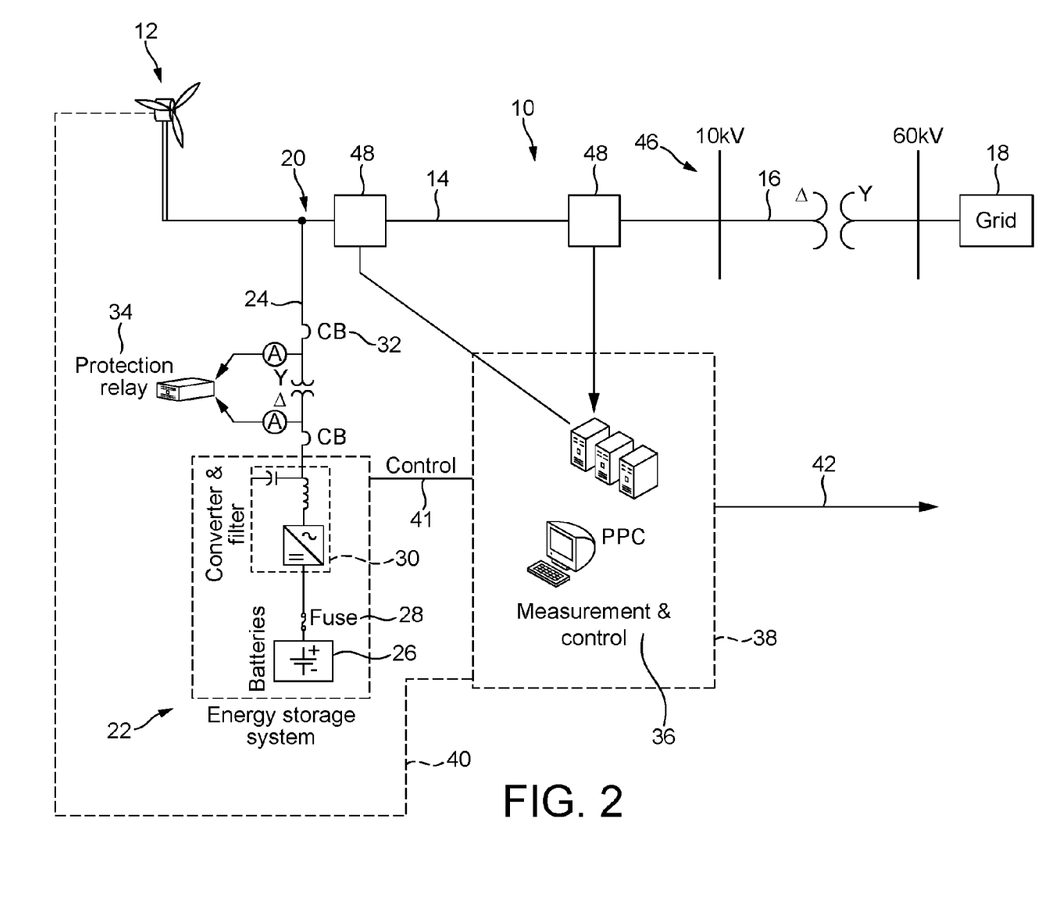
FIG. 2 illustrates an example embodiment of the invention.
Figure 3:
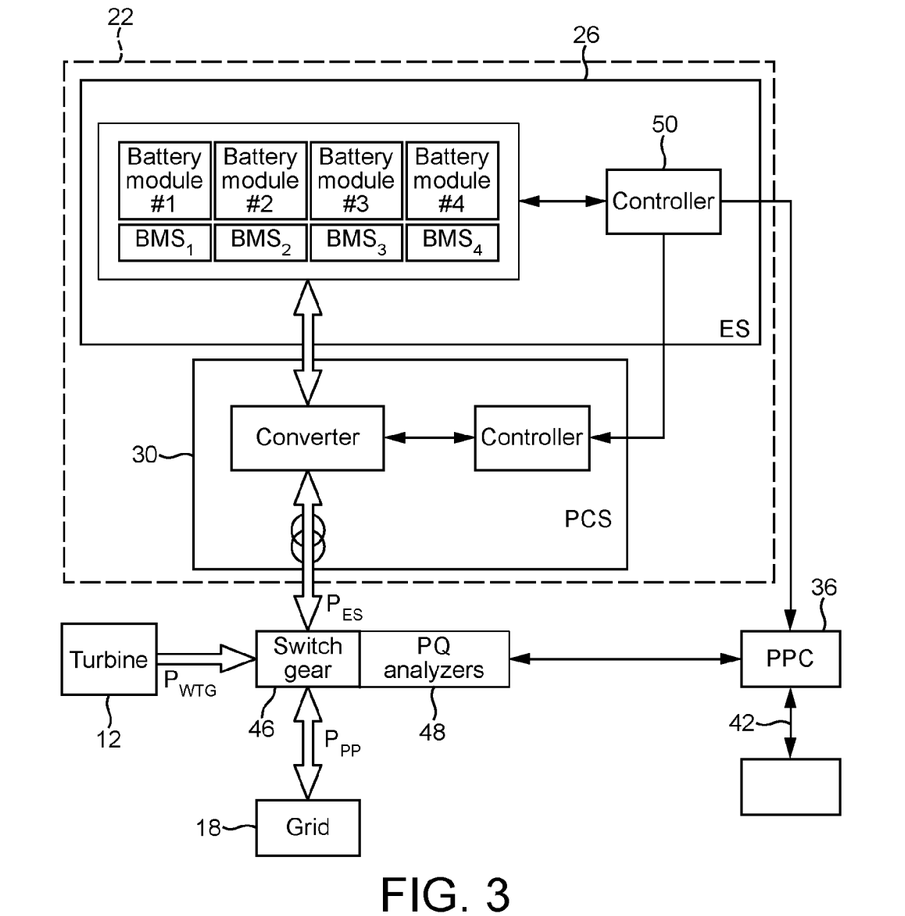
FIG. 3 illustrates an example embodiment of the energy storage system and power plant controller.

An example embodiment of the invention will now be described with reference to FIGS. 2 and 3. FIG. 2 is a schematic illustration showing a power generation plant having a wind park with an Energy Storage System (ESS) and a Power Plant Controller (PPC) according to a first example embodiment of the invention. FIG. 3 is an example embodiment of the energy storage system and power plant controller used in the generation system of FIG. 2.

The power generation system 10 comprises one or more wind turbines 12 in a wind park connected to a low voltage line 14 that terminates in a transformer 16. The transformer has a low voltage side connected to the low voltage line 14 and a high voltage side connected to the utility grid 18. The wind park and its component wind turbines connect to the low voltage line 14 at what is known as the Point Of Common Coupling (PCC) 20. An Energy Storage System 22 is additionally connected to the low voltage line 14 at the PCC 20 by means of a further low voltage line 24. In this context, lines 14 and 24 are at the same voltage, and are described as low voltage with reference to the higher grid voltage.

In this example, the Energy Storage System 22 comprises an energy storage device 26, in this case one or more batteries (though any appropriate energy storage device may be used), connected by a fuse 28 to a converter and filter apparatus 30. The converter and filter apparatus 30 connects the one or more batteries 26 to the low voltage line 24, and converts electrical signals between a form suitable for transmission on the voltage line 24, and a form suitable for presentation at the battery terminals. When the one or more batteries are being charged, the converter and filter apparatus 30 act as a rectifier converting AC to DC. When the one or more batteries are being discharged, it acts an inverter converting DC to AC. As is shown in FIG. 2, the voltage line 24 may also comprise one or more circuit breakers 32, as well as an optional protective relay 34.

The power generation system comprises a Power Plant Controller 36 PPC for receiving sensor inputs from the low voltage lines 14 and 24, and for issuing control commands to the Energy Storage System 20, and to the turbines of the wind turbine park. In this example, and as is known in the art, the individual wind turbines in the wind park are operated under the control of a SCADA system. Each turbine therefore has an individual SCADA controller (not shown) connected to a SCADA wind park controller 38 via a suitable control and signalling line 40. The Power Plant Controller communicates with the Energy Storage System 22 over line 41. The wind park controller 38 both receives and transmits control and signalling information to the individual turbines in the park, and as well as to a larger scale control network via line 42. Line 42 connects the wind park controller to the control network of the wind park operator, utility company, or transmission system operator.

The Power Plant Controller provides real time control of the individual wind turbines 12 in the wind park, and of the Energy Storage System 22, and acts as a high level power dispatcher. In this example, the Power Plant Controller 36 can be implemented as a component part of the SCADA wind park controller 38 or as a separate component configured to communicate with the SCADA wind park controller 38. As will be appreciated by the skilled person, the Power Plant Controller can be implemented using a computer processor and memory connected to the operational elements of the power generation system by a suitable signalling network. The functionality of the Power Plant Controller may reside in software or hardware alone, or in a combination of software and hardware.

FIG. 3 is schematically illustrates the operation of the Power Plant Controller and Energy System, focussing on the exchange of information between the different components. Although in this example the Energy Storage Device 26, is again shown as comprising one more batteries, it will be appreciated that in practice any form of energy storage can be used, such as chemical based storage, flywheel based storage, capacitor based storage, thermal energy storage, gravitational energy storage, compressed energy air storage, Hydrodynamic and Magnetohydrodynamic based storage. Other storage systems are also possible as will be appreciated by the person skilled in the art.

As noted above with reference to FIG. 2, both the one or more wind turbines 12 and the energy storage system 22 connect to the Point of Common Coupling 20. In FIG. 3, the Point of Common Coupling 20 is shown schematically as coinciding with the electrical switchgear apparatus located at the low voltage side of the transformer 16. In fact the PCC 20 may be before the switchgear 46 as shown in FIG. 2. The energy storage device 26 connects to the switchgear via the converter 30.

A Power Quality (PQ) Analyser 48 is located at the switchgear to read in real time one or more of the grid real power P, the grid reactive power Q, as well as the real and reactive power provided by the Wind Turbine and Energy Storage system. Operation of PQ analysers is well known in the art and will not be described here. The real time measurements made by the PQ analysers are transmitted to the Power Plant Controller 36 via a suitable transmission line. In this example, although use is made of the TCP/IP protocol, and in particular one of its variants Modbus TCP, other signalling protocols are also possible. In other embodiments, the Power Quality analyser 48 can be omitted, and use can be made of the SCADA system's intrinsic sensing capabilities. Additionally, although a single PQ analyser 48 has been described, this may be made up of a plurality of individually located PQ analyser components.

As shown in FIG. 3, the energy storage device 26 comprises a local controller 50 also having an PQ analyser for measuring in real time the operational characteristics of the energy storage device 26, such as active P(ess) and reactive Q(ess) power, State of Charge (SoC) and State of Health (SoH). These signals are also transmitted to the Power Plant Controller 36 via a suitable transmission line. Again, TCP/IP protocol transmission schemes are used in this example to implement the control line, though the example embodiment need not be limited to this.

Lastly, the Power Plant Controller 36 also receives a number of external inputs on line 42. The first of these is a forecast active power and reactive power reading, coinciding with a future period of time, for use in the control algorithms of the Power Plant Controller. As is known in the art, these inputs can be based on future predicted wind speeds for the location where the wind turbine power plant is installed, taking into account the size and capacity of the individual turbines. There are many ways that such inputs can be generated and supplied to the wind turbine operator. "Persistence" or "reference" based forecasts for example rely on climate data for the local terrain, as well as average of past production values collected from the wind turbine, to project a future forecast. The climate data can for example be based on computer models and simulations or can be built up over time from actual wind sensor readings taken at the turbine. Such techniques are well developed and are considered highly reliable within a four to six hour time frame. More sophisticated techniques may take into account meteorological data and weather reports extending over a much wider area than the local terrain, and including predictions of weather patterns. These techniques often also use data collected at the wind turbine combine with analysis of the wind turbine power curves and some statistical analysis. Their reliability is however often not as good as the Prediction or Reference models noted above. Inputs describing predicted power will therefore generally be available to the utility company or wind park operator and so will not be described in more detail here.

Additionally, the Power Plant Controller is also configured to receive an input specifying one or more of the droop setting, the droop response, magnitude of the droop response, and time period for delivery that is to be applied to the output of the power generation system 10, at a specific time in the future, and for a specific duration. Where a particular droop setting is specified for the power generation system, this will be used to override the default droop value (set at 5% say) for the duration of the time specified. Once this time period has elapsed, the droop setting for the wind turbine will return to the default value, unless a further droop value has been specified at which point, a further override of the default value will take place. Although in embodiments different droop settings and different droop responses may be applied to each of the wind turbines in the park individually, it is preferred in this example if the droop setting and droop response is applied for the wind park and for the energy storage system as a whole. This avoids hunting phenomena between different wind turbines attempting to provide the desired response.

Droop settings are transmitted to the individual wind turbine controllers and to the controller 50 of the energy storage device 26 via the SCADA control system and/or dedicated signalling lines, such as those employing the TCP/IP protocol mentioned above. The droop setting input in particular allows the utility or transmission system operator flexibility in deciding how to utilise the generation capacity provided by the wind park 12 to meet grid demand. A number of different droop settings and droop responses may be appropriate depending on the circumstances.

For example, a 3% at 300 MW system droop configuration requires the droop setting for the wind park and energy storage system combination to be 3%, and the magnitude of the droop response to be 300 MW, delivered over a set period of time, say a default time period of 3 minutes. This will mean a power of 100 MW (300 MW/3 m) delivered or withheld each minute to the grid, depending on the frequency characteristic. As explained in the introduction, the droop setting of 3% links the power response to the frequency response, measured in per units. Again, assuming a system frequency of 60 Hz, and a rating for the wind park of say 900 MW, a 3% droop setting equates to a change in frequency as follows:

$$\Delta f = \Delta P \cdot R$$

$$\Delta f / 60 = 300/900 \cdot (0.03)$$

$$\Delta f = 0.6 \text{ Hz}$$

Thus, with this setting, for each 0.6 Hz change in frequency, a power of 300 MW would need to be supplied (or withheld) over the three minutes response period. A droop setting of 3% at 150 MW on the other hand requires that for each 0.3 Hz change in frequency, 150 MW of power needs to be supplied (or withheld) over the same three minute period. Lastly, a droop setting of 8% at 50 MW would indicate that for each 0.26 Hz change in frequency at the grid, a power of 50 MW is to be injected (or withheld) over the same time period of 3 minutes.

Although in these three example cases, the time periods over which the power is delivered is the same, the 3% at 300 MW droop setting can be considered to be provide a faster droop response than the 3% at 150 MW droop configuration. This is because for the same deviation in frequency (say 0.6 Hz) the same power is supplied in both cases, but in the 3% at 300 MW case, the power is supplied in half of the time, namely the time period of 3 minutes, while in the 3% at 150 MW case, 150 MW is provided in the first 3 minutes and a further 150 MW in the following 3 minutes.

A high setting (such as 3% at 300 MW in this case), defining a 'fast' power response, may for example be appropriate where there is high penetration of wind turbine power plants in the generation capability of the grid, and the grid utility operator requires further generation capacity to be available to meet demand at short notice. Such cases may be when the operator plans to take a transmission line out of action in order to carry out maintenance work for example. By requesting the Power Plant Controller 36 to ensure a droop of 3% at 300 MW is available for the time that the maintenance is scheduled to take place, the utility operator can manage the maintenance of the transmission line, with confidence that extra generation capacity is readily to stabilise the system should power imbalances occur. This also means that there is less need to ensure that traditional generation capabilities, such as coal and nuclear, are available to provide spinning reserve to meet unanticipated additional demand.

On the other hand, a droop setting of 8% at 50 MW, which as can be seen above provides a 'slow' response, can be used where the utility operator wishes to de-emphasise the role of wind generation in frequency generation, in favour of other generation, or where wind generation penetration in the grid is not so advanced.

In these example settings, the speed of the response has been considered in connection with a default time period of 3 minutes. This reflects the fact that there is no current convention on the speed of the response time. In the example embodiment of the invention, the length of the period of time in which the power is to be delivered is also specifiable, and can be set to any figure. Of course, 'fast' responses, such the 3% at 300 MW droop configuration mentioned above, can be made twice as fast by specifying that the response time for providing the 300 MW of power is 1.5 minutes.

In practice, the actual droop response available from the wind park at any time will be dependent on the wind energy available. For this reason, the power provided by the wind turbine park 12 is enhanced by power provided by the Energy Storage System (ESS) 22. This ensures that commitments made by the Power Plant Controller 26 to provide future generation or responsivity are met.

As will be appreciated from the discussion above, applying a particular droop configuration to the power generation unit assumes that the power output ramp rate for the wind turbine can be set accordingly to deliver power in the predetermined time period. For example, a droop rate of 3% at 150 MW requested for a future time period assumes that the power plant will be able to ramp up power output at a particular power ramp rate of 833 KW/s (150 MW/3×60 s). If the output power is to be ramped up, however, this also assumes that the wind generation unit is not operating at the beginning of the ramp procedure at full capacity, and that in other words it is able to provide spinning reserve. However, even if the wind turbine is operating below full capacity, the desired rate of power supply may not possible due to poor wind conditions at the time the power is required. For this reason, additional power will need to be supplied from the Energy Storage Device 26.

The representative control parameters and signals received by the Power Plant Controller 36 are therefore as follows:
P(ess)_ref ESS active power reference
Q(ess)_ref ESS reactive power reference
P(pp)_ref Power Plant active power reference
Q(ess)_ref Power Plant reactive power reference
P(wtg) Wind Turbine active power
Q(wtg) Wind Turbine reactive power
P(grid) Grid active power
Q(grid) Grid reactive power
P(ess) ESS active power
Q(ess) ESS reactive power
SoC State of Charge indication
Alarm State of Health indication
P(forecast) Forecast active power
Q(forecast) Forecast reactive power
DroopConfiguration Utility or Transmission System Operation Desired Droop Configuration (including one or more of droop setting, droop power magnitude, droop response time)
Time Current time The Power Plant active and reactive power references P(pp)_ref and Q(ess)_ref are the control signals supplied to the generation system 10 reflecting the current grid demand for power, as well as any frequency and voltage control considerations. As will be known in the art, they are determined based on the instantaneous power, voltage and current readings taken from the PQ analyser 44, as well as any overriding control signals from the utility or transmission system operator for more or for less power.

Based on P(pp)_ref and Q(ess)_ref, the Power Plant Controller 36 calculates the Active and Reactive Power References P(ess)_ref and Q(ess)_ref need to control the output power supplied by the Energy Storage System 26 to the grid, such given the power output P(wtg) and Q(wtg) from the wind turbines the P(pp)_ref and Q(ess)_ref values are satisfied. The control algorithm can be expressed as follows:

$$P(ess)\_ref = P(pp)\_ref - P(wtg) \qquad [1]$$

Where there is an imbalance in the power frequency characteristics at the grid, such as caused by a sudden mismatch in supply and load resulting from a fault, the P(pp)_ref for the power generation plant will change to reflect the new operation conditions.

The individual wind turbine controllers will then act to ramp up or ramp down the power output from the wind generators to address the instability at the grid, and do so according to the requested droop configuration and ramp rate setting effective for the wind turbine controller for that period of time. Ramping up or ramping down the power provided by an individual wind turbine generator is typically achieved by controlling the pitch angle of the rotor blades to increase the torque on the generator rotor for a given incident wind strength, as for synchronous generators the speed of the rotor shaft remains substantially the same. Where the individual wind turbines are unable to provide a requested increase in power due to scarcity of wind, the Power Plant Controller 36 must adjust the output power control signal for the Energy Storage System P(ess)_ref in order to compensate for the lack of desired power available from the wind turbine.

Where a fast droop response is required for a future time period, the wind turbine power plants will therefore be initially operated in a regime where they run at undercapacity, thereby creating headroom for more power to be supplied where it is needed in order to meet droop commitments. By way of example, the wind turbines are operated at say 80% of their rated output power for the period where an high droop response has been requested (assuming wind is available for that period), so that where additional power ramp up is required, the wind turbine can provide an additional 20% of its generation.

In order to manage the provision of a required droop response, the Power Plant Controller maintains a log of future time periods for which a desired droop has been specified and compares this with indications of the future power available from the wind and therefore from the wind power turbine generators P(forecast) and Q(forecast).

For example, consider a scenario where a desired droop of 3% is required for a 72 hour time period commencing 7 days in the future. The Power Plant Controller will first log the instruction in a scheduler and confirm that there are no pre-existing or overlapping instructions for the same time period. Assuming that there are no pre-existing commitments to provide a different droop, the Power Plant Controller will then consult the predicted available power for the 72 hour period and determine whether favourable or poor wind conditions are expected. Where the wind conditions are poor for the period in question, the Power Plant Controller will ensure that over the next 7 day period, the charge on the Energy Storage System 26 is built up so that when the higher droop is required there is sufficient charge available to meet a shortfall in the wind. In the worst case scenario, the Energy Storage System may be required to provide all of the power from the power generation plant without recourse to wind generation for the entire period.

Figure 4:
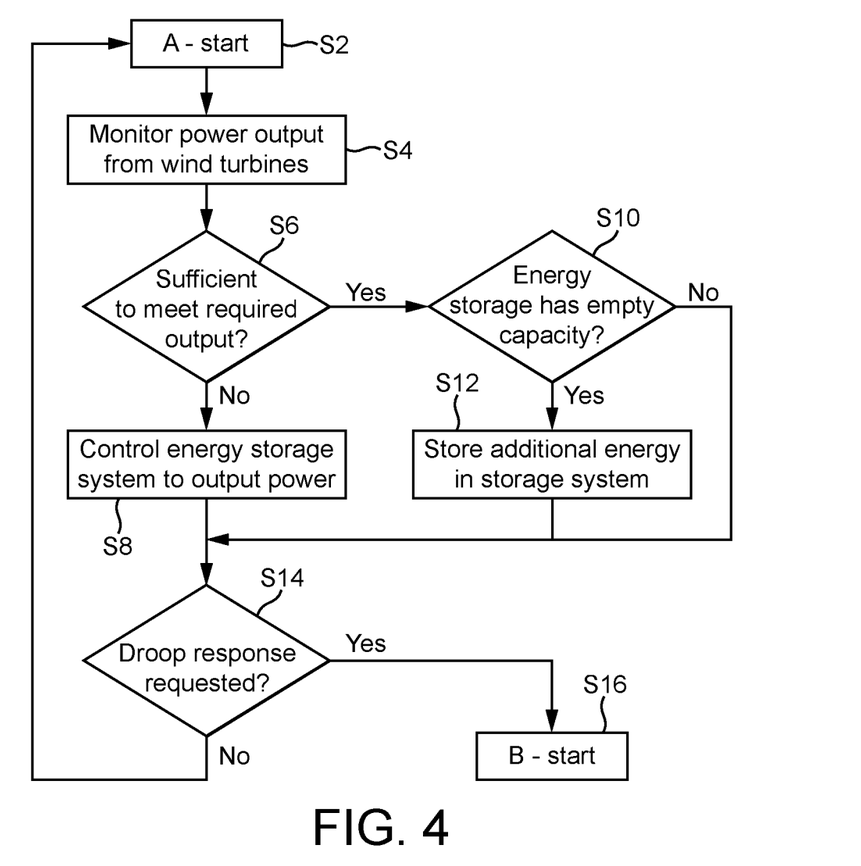
FIG. 4 is a flow chart illustrating an algorithm control loop for operation of the Power Generation System.
Figure 5:
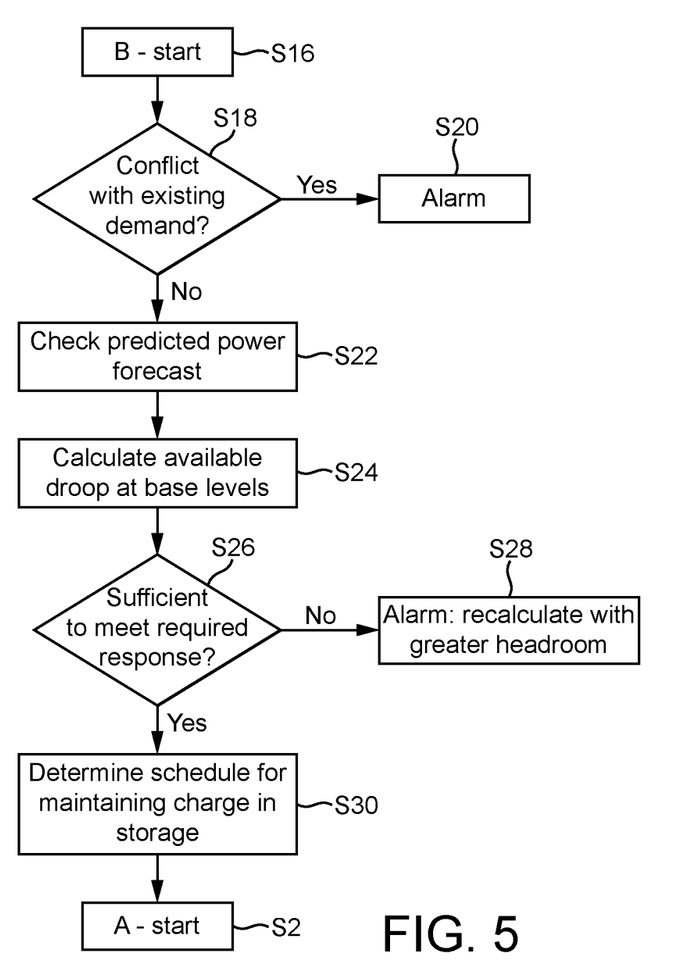
FIG. 5 is a flow chart illustrating an algorithm control loop where a specified droop value has been selected by a user.

An example control algorithm for the Power Plant Controller 36 will now be described with reference to FIGS. 4 and 5. FIG. 4 is a flow chart illustrating an algorithm control loop for operation of the Energy Storage System 22 and the wind turbines 12 under normal operating conditions, that is where the droop provided by the system is set to a default value such as 5%. FIG. 5 is a flow chart illustrating an algorithm control loop where a specified droop value has been selected by a user, such as the utility grid or transmission system operator. In theory, the selectable droop may be set to any value, but is likely to be in the range 1% to 15%.

The control algorithm begins in step S2. In Step S4, the Power Plant Controller (PPC) reads one or more power inputs from the Energy Storage System 22 and the one or more wind turbines 12 or wind park. As noted above, these power inputs include the ESS active power reference (P(ess)_ref), the ESS reactive power reference (Q(ess)_ref), the Power Plant active power reference (P(pp)_ref), the Power Plant reactive power reference (Q(ess)_ref), the Wind Turbine active power (P(wtg)), the Wind Turbine reactive power (Q(wtg)), the Grid active power, (P(grid)), the Grid reactive power (Q(grid)), the ESS active power (P(ess)), the ESS reactive power (Q(ess)), and the ESS State of Charge indication (SoC). The input may also include an Alarm signal indicating the State of Health of the ESS.

In particular, in Step S4, the Power Plant Controller (PPC) determines the power output from the one or more wind turbines 12 P(wtg), and in Step S6 the PPC determines whether this power output is sufficient to meet the power requirement that the power generation system 10 must supply to the grid 18. If it is not, then in step S8, the PPC 36 sends a signal to the ESS 22 instructing it to increase its power reference and output more power (see equation 1 above) so that any shortfall is met. In step S6, if the wind turbines are supplying sufficient power to meet the grid requirements, then in step S10 the PPC determines whether the ESS has remaining storage capacity. If there is unused storage capacity, then any power produced by the wind turbines that is surplus to the grid requirements, can be stored in the ESS 22 in step S12.

The power provided in step S8 will, as noted above, include any additional power to be provided for frequency control purposes, and will therefore be dependent on the droop configuration requested for that instant of time, as well as on the conditions at the grid. During operation, power can be provided from the Energy Storage system to the grid in a matter of seconds, with control of the wind turbines to provide output power taking longer. In step S8, the control system can therefore direct the energy storage system to output power in the first seconds following a disturbance, and allow this to tail off as the turbines become able to provide the desired power response 30 s seconds and/or minutes later. Other response profiles may of course be possible.

Control flows from steps S8 and S12 to step S14, where the PPC determines whether a new request for a specific droop response has been requested by a utility or transmission system operator. If no new droop request has been received, then the control algorithm returns to step S2 to repeat the control steps for regulating the power output of the power generation system.

If there is an existing droop request stored in the memory of the PPC for a future time period, then when control returns to step S2, the PPC may determine additional measures for the control of charge storage in the ESS. For example, it may not be desirable to operate the ESS so that where surplus power is produced by the wind turbines it is always automatically stored in the ESS, as this may degrade the storage capability in the long term. However, where a high droop response is anticipated in the near future, the PPC is likely to require the ESS to be a full capacity or close to full capacity so that there is the necessary additional power reserve available.

In Step S14, if a new droop response request has been received, then control flows to step S16 and from there to step S18 in FIG. 5. In Step S18, the PPC determines the time period for which the droop response has been requested, and whether this new selectable droop request conflicts with an existing request stored in memory. A conflict will occur if the time period for the new droop response request fully or partially overlaps with the existing memory entry. If there is an overlap, then in Step S20, the PPC issues an alarm to the utility grid or transmission system operator requesting confirmation of the instruction. If the new request is confirmed then the existing droop response request stored in memory can for example simply be overwritten. In practice, however, it is envisaged that droop response requests will not be received from multiple parties, but rather always from the utility or transmission system operator. Real conflicts in the requested droop response are therefore unlikely.

Control then flows to S22, where the PPC determines for the time period where the selectable droop response has been requested, the predicted power generation capability of the power generation system. Data describing the predicted power generation capability is available in many forms and can be supplied to the PPC in known fashion. At the very least, the predicted power may simply be calculated from the weather and wind speed forecast for that time period, adapted to take into account fluctuations at the locality where the power generation system is located. Where specific weather and wind speed information for the time period is not available then the power may also be predicted from historical data collected for that wind power generation system in previous years. The predicted power data is represented as the forecast active power (P(forecast)) and as the forecast reactive power Q(forecast).

In determining the predicted power output for the relevant time period (the time period where a specific droop response has been requested), it may also be necessary to consider the power generation capability for the time period immediately preceding the relevant period, as the power availability for the preceding time period will have an effect on the amount of charge that can be stored in advance in the Energy Storage System.

In Step S24, the PPC then calculates the ability of the power generation system to meet the droop that has been requested. This ability will rely on there being sufficient wind power available during the relevant period. If the wind power is expected to be low, then the requested droop may still be met using power supplied from the Energy Storage System. The storage capacity of the ESS will also place a limit on the amount of droop response that can be provided.

In Step S26, if the PPC determines that the amount of droop that the power generation system can provide for the relevant time period is not sufficient to meet the droop response demand, then the PPC in step S28 the PPC issues an alarm signal. The alarm signal may take a number of forms. If the request response droop is simply too high to be met, due to extremely low anticipated power output, then the alarm signal will notify the utility or the transmission system operator of this. The alarm signal may also provide a recalculated droop response that can be provided under the conditions during the relevant time period, and request that the utility operator or transmission system operator confirm that the suggested droop value is acceptable. The PPC can increase the droop response that is available at any time, by derating the power output of the wind turbines so that they have more headroom to respond to fluctuations at the grid. A suggested de-rating of the power generation system with a concomitant increase in droop response may therefore also be suggested to the utility grid or transmission system operator.

If the requested response can be met, then in Step S30, based on how far in the future the relevant time period is set occur, the PPC determines a schedule to ensure that the ESS is fully charged in time for the required period. This schedule can be fed back into the control algorithm illustrated in FIG. 4 for consideration in Steps S6, S10 and S12. Control finally flows back to step S2.

Accordingly, a power plant controller has been described. The power plant controller controls a power generation system having one or more power generators and an energy storage system, and provides a utility grid or transmission system operator with the capability to select the droop provided by the power generation system. Accordingly, an operator can request a specific generator droop response in order to provide appropriate frequency and grid control services. The power plant controller operates in real time determining one or more power characteristics of the power generation system. Based on these characteristics and an indication of a future predicted power output for the power generation system, the power plant controller can take the necessary steps to ensure that the power generation system is capable of responding with the selected droop, or can advise the operator that a different droop is preferred.

Although the above example embodiments of the invention have been described with reference to wind power generation systems, the invention is not so limited. Alternative embodiments for example include generation from other forms of renewable energy resources, such as wave power, tidal generation, and solar, where generation is not guaranteed, but where there is a desired to firm up output power capacity and response. Where different example embodiments of the invention have been described, it will be appreciated that features of one embodiment may be used in other example embodiments of the invention.

The invention claimed is:

1. A power generation system comprising:
a power generator for generating power from a renewable energy resource;
a connection point connecting the power generator to a power grid, the connection point having a transformer with a low voltage side and a high voltage side, the power generator being coupled to the low voltage side;
an energy storage system coupled to the low voltage side of the connection point, wherein the energy storage system is operable to provide power to the power grid in addition to that provided by the power generator, or to store power generated by the power generator, so as to regulate the power output from the power generator to the grid;
a power plant controller that receives:
a power input indicating power characteristics of at least one of the grid, the power generator, the energy storage system, and the connection point, and
a request input from the power grid operator to provide power generation with a specified selectable droop response, wherein based on the power input and the specified selectable droop response, the power plant controller is configured to control the power generator and the energy storage system; and
wherein the power plant controller is configured to derate the power generator in advance of a time period when the specified selectable droop response has been requested in order to provide generation capacity to meet the specified selectable droop response.

2. The power generation system of claim 1, wherein the power plant controller comprises a memory for logging requests from the power grid operator for a specified selectable droop response for future time periods.

3. The power generation system of claim 2, wherein the power plant controller is operable to alert the power grid operator if a request from the power grid operator to provide power generation at specified selectable droop response coincides in time with a separate earlier request.

4. The power generation system of claim 1, wherein the power plant controller determines a predicted future power output for a time period corresponding to a time period where a specified selectable droop response has been requested, and based on the determined predicted future power output controls one or more of the energy storage device and the power generator.

5. The power generation system of claim 4, wherein based on the determined predicted future power output the power plant controller controls the energy storage device to ensure that it has a full charge to meet the request for the specified selectable droop response.

6. The power generation system of claim 1, wherein the power plant controller issues an alarm when a selected droop response cannot be provided due to a shortfall in a predicted future power output, and/or the storage capacity of the energy storage system.

7. The power generation system of claim 1, wherein the energy storage system is operable to:
store power from the power generator when the power produced by the generator is in excess of the power required by the power grid, and
output power to the grid when the power produced by the generator is less than the power required by the power grid.

8. The power generation system of claim 1, wherein the selectable droop response includes one or more of, a droop setting, a droop response magnitude, and a droop response time.

9. The power generation system of claim 1, wherein the power generator comprises one or more of a wind energy turbine, a wave or tidal energy turbine, or a solar cell.

10. The power generation system of claim 1, wherein the power generator comprises a plurality of wind turbines in a wind park.

11. A power plant controller for controlling the operation of a power generation system comprising a power generator for generating power from a renewable energy resource, a connection point connecting the power generator to a power grid, the connection point having a transformer with a low voltage side and a high voltage side, the power generator being coupled to the low voltage side and an energy storage system coupled to the low voltage side of the connection point, wherein the energy storage system is operable to provide power to the power grid in addition to that provided by the power generator, or to store power generated by the power generator, so as to regulate the power output from the power generator to the grid, wherein the power plant controller is operable to:
receive a power input indicating power characteristics of at least one of the grid, the power generator, the energy storage system, and the connection point, and
a request input from the power grid operator to provide power generation at specified selectable droop response, wherein based on the power input and the specified selectable droop response, the power plant controller is configured to control the power generator and the energy storage system; and
wherein the power plant controller is configured to derate the power generator in advance of a time period when the specified selectable droop response has been requested in order to provide generation capacity to meet the specified selectable droop response.

12. A method of generation power using a power generation system comprising a power generator for generating power from a renewable energy resource, a connection point connecting the power generator to a power grid, the connection point having a transformer with a low voltage side and a high voltage side, the power generator being coupled to the low voltage side, and an energy storage system coupled to the low voltage side of the connection point, wherein the energy storage system is operable to provide power to the power grid in addition to that provided by the power generator, or to store power generated by the power generator, so as to regulate the power output from the power generator to the grid, the method comprising:
- receiving, at a power plant controller, a power input indicating power characteristics of at least one of the grid, the power generator, the energy storage system, and the connection point;
- receiving, at a power plant controller, a request input from a power grid operator to provide power generation at specified selectable droop response;
- controlling the power generator and/or the energy storage system based on the power input and the specified selectable droop response; and
- de-rating the power generator in advance of a time period when the specified selectable droop response has been requested in order to provide generation capacity to meet the specified selectable droop response.

13. The method of claim 12, further comprising storing in memory requests from the power grid operator for a specified selectable droop response for future time periods.

14. The method of claim 13, further comprising issuing an alert to the power grid operator if a request from the power grid operator to provide power generation at specified selectable droop response coincides in time with a separate earlier request.

15. The method of claim 12, further comprising:
- determining a predicted future power output for a time period corresponding to a time period where a specified selectable droop response has been requested; and
- controlling one or more of the energy storage device and the power generator, based on the determined predicted future power output.

16. The method of claim 15, further comprising controlling the energy storage device to ensure that it has a full charge to meet the request for the specified selectable droop response, based on the determined predicted future power output.

17. The method of claim 12, further comprising issuing an alert if a selected droop response cannot be provided due to a shortfall in a predicted future power output, and/or the storage capacity of the energy storage system.

18. The method of claim 12, wherein the selectable droop response includes one or more of, a droop setting, a droop response magnitude, and a droop response time.

19. The method of claim 12, wherein the power generator comprises one or more of a wind energy turbine, a wave or tidal energy turbine, or a solar cell.

20. The method of claim 12, wherein the power generator comprises a plurality of wind turbines in a wind park.

* * * * *